March 6, 1934.                G. BUCKY                1,949,600
LUMINOUS INDICATOR FOR MEASURING INSTRUMENTS
Filed Oct. 24, 1933
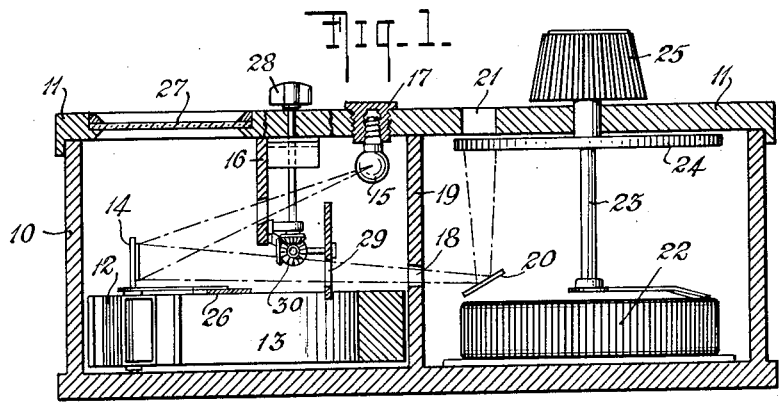
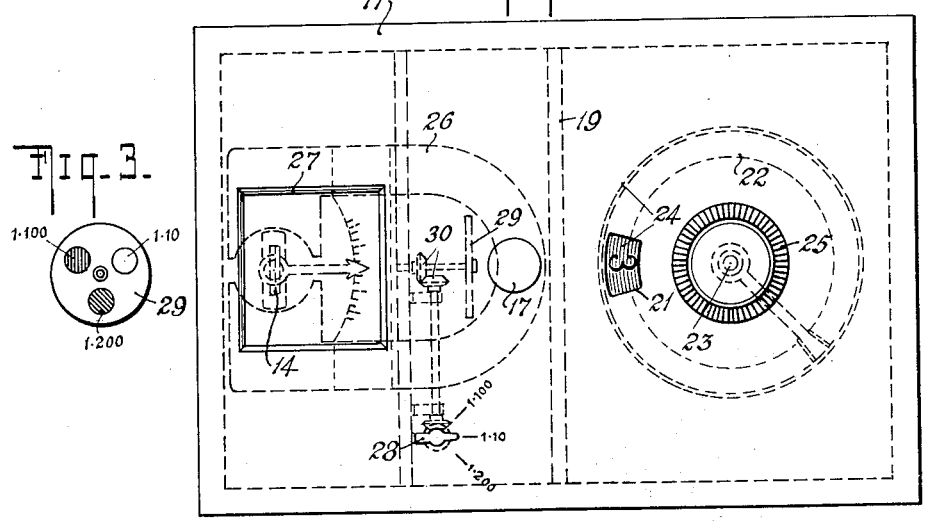
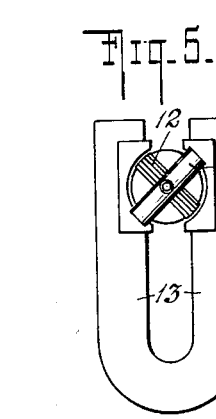
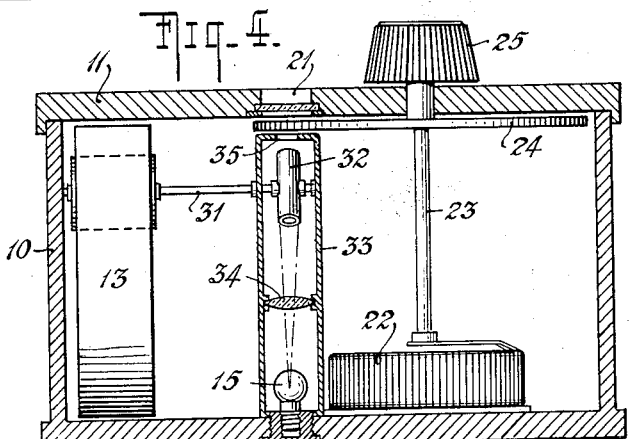
WITNESS
INVENTOR
GUSTAV BUCKY
BY
ATTORNEYS Patented Mar. 6, 1934

1,949,600

UNITED STATES PATENT OFFICE 1,949,600

LUMINOUS INDICATOR FOR MEASURING INSTRUMENTS

Gustav Bucky, New York, N. Y.

Application October 24, 1933, Serial No. 694,976
In Germany January 7, 1932

11 Claims. (Cl. 171—95)

The present invention relates to a device for the determination or measurement of certain magnitudes by means of an adjusting and a measuring mechanism. It is particularly adapted for use by technically inexperienced persons and also for the rapid carrying out of measurements in which it is important to recognize or detect quickly a definite value or a number of such values. My improved mechanism is also particularly suited for transportable arrangements.

One of the important features of the invention resides in the fact that for the recognition of definite adjusted values, there is employed a luminous indicator which becomes visible only when these predetermined values are reached.

The use of light beams as indicators of measuring devices, wherein also mirrors are on occasion employed upon the rotating system, is in general known; also in the so-called light band instruments the illuminated scale is partly covered, corresponding to the position of the pointer at any instant, by means of a diaphragm connected with such pointer. For radio apparatus it has already been proposed to provide the adjustable scale of the variable condenser with holes at specially selected positions through which a beam of light falls when such positions are exactly reached. Devices have also been proposed for scales in which in the zero position of the pointer, the latter interrupts a beam of light acting upon a selenium cell and thereby automatically places in operation a dumping device for the weighed material. Transparent beams illuminated by incandescent lamps are also known in signalling and measuring apparatus; furthermore, by the use of adjustable diaphragms opposite scales of various kinds of apparatus, special measuring fields on such scales have been made specially distinguishable.

According to the present invention, there is provided a new application of luminous indicators for definite positions of the adjusting mechanism or conditions of electrical circuits by causing a measuring device in an electrical circuit controlled at the adjusting device, for example, a bridge galvanometer, to direct the light beam upon the reading area of the adjusting device only in the predetermined position and thereby indicates not only the correct balancing of the whole arrangement, but at the same time makes possible or facilitates the reading off of the desired value of the adjusting scale or other mechanism.

The invention will be further described with the aid of the accompanying drawing which shows by way of example two embodiments of the invention. In said drawing, Figs. 1 and 2 show a longitudinal vertical section and a plan view, respectively, of a measuring device provided with a mirror for deflecting a light beam; Fig. 3 shows a detail; while Fig. 4 shows a vertical section of a modified construction, Fig. 5 showing an end view of the measuring device.

The whole mechanism is housed within a casing or box 10 provided with a cover 11. The movable system 12 of the galvanometric measuring device 13 carries a mirror 14, upon which a beam of light from an incandescent lamp 15 falls after passing through a shutter or screen 16. The lamp is made easily replaceable in the cover 11 by means of a removable socket 17. The beam of light is directed by the mirror through an opening 18 in a partition wall 19 provided in the casing and impinges an inclined mirror 20 located behind such wall, such latter mirror throwing the beam vertically upward into a window 21 in the cover 11. In the right half of the casing there is arranged a resistance 22 whose adjustable shaft 23 carries a scale 24 made of a dull or translucent glass or similar material upon which any suitable values are indicated which correspond to the adjustment of the resistance 22. The resistance is varied by means of a knob 25 and the whole switching arrangement may, for example, be so constructed that the resistance is arranged within one branch of a Wheatstone bridge, in whose diagonal line is arranged the galvanometer 13, while to the other diagonal points of the bridge any controlled voltage is connected. By suitable regulation of the resistance 22 the galvanometer 13 is placed in the middle or zero position and upon reaching such position, the beam of light is thrown through the opening 18 and illuminates the corresponding part of the resistance scale 24 which thereby appears brightly illuminated in the widow 21. In the arrangement described, the adjusted value of the resistance or any other value standing in predetermined relationship with the latter can be read off. Under certain conditions it is sufficient to indicate by the illumination of the window or by any other area of light simply the attainment of equilibrium in the Wheatstone bridge system.

If required, the position of the galvanometer mechanism itself can be made distinguishable on a scale 26, for example, by means of a window 27.

In a further development of the invention, I provide means for indicating at a glance the factor by which the readings on the scale are to be multiplied to give the true values where the numerals on the scale are of a different order of magnitude from the values to be measured. The measuring device 13 can thus be adapted for a variety of measuring ranges, depending on the shunt across the instrument. In the form of the invention illustrated, the particular factor above mentioned is indicated by suitably coloring the light beam thrown upon the scale. This selective coloring may be accomplished by means of a switch 28 or similar mechanism to which is connected rotatable diaphragm 29 by a gearing 30, such diaphragm lying in each of its, for example, three openings in the path of the light beam projected by the mirror 14. The diaphragm openings associated with the various measuring ranges, for example, 1:10, 1:100 and 1:200, are covered with transparent films colored white, red, and green, so that the color appearing in the window 21 immediately indicates by what value the amount appearing on the scale is to be multiplied to give the correct reading.

Figs. 4 and 5 show a somewhat simplified form of the invention in which the measuring device 13 is arranged vertically within the casing 10, the axis of its rotatable system 12 lying horizontally. At the free end of the rotatable shaft 31 is arranged a tubular screen or shutter 32 which is positioned within a light-proof chamber 33. An incandescent lamp 15 is mounted upon the bottom of the box 10 and within the chamber 33, the light from the lamp being directed vertically upward by a lens 34. When the tubular shutter 32 is in the vertical position, which may correspond, for example, to the zero position of the measuring instrument, the light beam becomes visible in a window 21 in the cover 11 of the casing 10. Between the window and the shutter-like upper section 35 of the chamber 33, there is arranged the scale disc 24 of the resistance 22 which is adjusted as described above in connection with Figs. 1 and 2 by means of a knob 25. As in the above described mechanism, the light beam in Figs. 4 and 5 becomes visible only in a definite position of the measuring device, and particularly the zero position. Also in this arrangement the measured value can be read off, directly if desired, upon the scale 24.

The arrangements of the two embodiments of the invention illustrated can also be utilized for making discernible a plurality of positions of the measuring instrument, as, for example, by placing two intersecting tubular shutters upon the axis of the movable system, such shutters containing differently colored glasses or filters so that, depending upon the color with which the adjusted part of the scale becomes illuminated, the nature of the values in question can be readily ascertained. For example, maximum and minimum limiting values can be made visible in this fashion. Similar results can be obtained in the mechanism shown in Figs. 1 and 2, for example, with the use of a plurality of juxtaposed diaphragms or shutters, of which the middle one shows the normal value with white light, while the other diaphragms give indications with for example, green or red light, when limiting values are exceeded in one or the other direction.

I claim:

1. A measuring arrangement for electrical circuits having a luminous indicator for predetermined positions, comprising, in combination, means for measuring the condition in an electrical circuit, a source of light, means presenting a reading area for indicating the measured condition of said circuit, and a device associated with said measuring means and arranged to direct the light beam upon the reading area only in a predetermined position of said measuring means, said reading area remaining otherwise unilluminated by said beam.

2. A measuring arrangement for electrical circuits having a luminous indicator for predetermined positions, comprising, in combination, means for measuring the condition in an electrical circuit and including a movable system mounted on a rotatable axle, a source of light, means presenting a reading area for indicating the measured condition of said circuit, and a device associated with said measuring means and arranged to direct the light beam upon the reading area only in a predetermined position of said measuring means, said device including a tubular diaphragm fixed to the axle of the movable system of the measuring means, said diaphragm being so arranged on said axle and with respect to said reading area that in the predetermined position of the measuring device the light beam travels axially through such diaphragm and upon the reading area.

3. Apparatus according to claim 1, wherein a mirror is arranged upon the movable system of the measuring device in position to reflect the light from said light source, said device including a fixed diaphragm having an opening through which the beam reflected by the mirror passes only in the predetermined position of the measuring device.

4. A measuring arrangement for electrical circuits having a luminous indicator for predetermined positions, comprising, in combination, a measuring device, a member for regulating the adjustment of said measuring device, a scale associated with said member, a source of light, and a diaphragm between said source of light and said scale, said scale being so arranged that in a predetermined position of the measuring device it is illuminated by the beam of light passing through the diaphragm and makes ascertainable the value corresponding to the predetermined measuring device position.

5. Apparatus according to claim 4, wherein the scale is at least partly transparent and is struck upon the rear thereof by the light beam.

6. A measuring arrangement for electrical circuits having a luminous indicator for predetermined positions, comprising, in combination, means for measuring the condition in an electrical circuit, a source of light, means presenting a reading area for indicating the measured condition of said circuit, a device associated with said measuring means and arranged to direct the light beam upon the reading area only in a predetermined position of said measuring means, a series of differently colored diaphragms, and operating means coupled with the diaphragms for selectively interposing a diaphragm in the path of the light beam and thereby imparting to the beam a characteristic color indicative of the measuring range of the measuring means.

7. A measuring arrangement for electrical circuits having a luminous indicator for predetermined positions, comprising, in combination, means for measuring the condition in an electrical circuit, a source of light, means presenting a reading area for indicating the measured condition of said circuit, and a device associated with said measuring means and arranged to direct the light beam upon the reading area only in a predetermined position of said measuring means, said reading area remaining otherwise unilluminated by said beam, and a series of differently colored diaphragms between the measuring means and the reading area for imparting to the beam a characteristics color which conveys a definite intelligence to the observer.

8. A measuring arrangement for electrical circuits having a luminous indicator for predetermined positions, comprising, in combination, means for measuring the condition in an electrical circuit, a source of light, means presenting a reading area for indicating the measured condition of said circuit, mechanism associated with the measuring means to direct the light beam upon the reading area, and means for limiting the incidence of the light beam upon the reading area to a predetermined limited range within the limits of movement of the measuring instrument.

9. A measuring arrangement for electrical circuits having a luminous indicator for predetermined positions, comprising, in combination, means for measuring the condition in an electrical circuit, a source of light, means presenting a reading area for indicating the measured condition of said circuit, means associated with the measuring means to direct the light beam upon the reading area, and mechanism interposed between the measuring means and the reading area for determining the ocular impression upon an observer in accordance with the range in which the measuring means is positioned within its limits of movement.

10. A measuring arrangement for electrical circuits having a luminous indicator for predetermined positions, comprising, in combination, means for measuring the condition in an electrical circuit, a source of light, means presenting a reading area for indicating the measured condition of said circuit, means associated with the measuring device to direct the light beam upon the reading area, and a plurality of differently colored diaphragms arranged between the measuring means and said reading area, said diaphragms being allocated to different delimited ranges within the limits of movement of the measuring means and adapted to impart different colors to the light beam according as the measuring means is positioned within one or another of said ranges.

11. A measuring instrument for electrical circuits having a luminous indicator for predetermined positions, comprising, in combination, a casing, a measuring device in said casing, a member for regulating the condition in an electrical circuit and thereby modifying the position of said measuring device, a scale connected with said member to move therewith, said casing having an opening through which a limited portion of said movable scale is visible, a source of light in said casing, means associated with the measuring device for directing the beam of light toward the scale, and mechanism interposed between the measuring device and the scale for limiting the incidence of the light beam upon the scale, in registry with said opening, to the position of the measuring instrument in a predetermined range within its limits of movement.

GUSTAV BUCKY.